Feb. 6, 1940.  W. D. HERSHBERGER  2,189,549
ANTENNA SWITCHING SYSTEM
Filed March 18, 1938  2 Sheets-Sheet 1

Inventor
William D. Hershberger
By [signature]
Attorney

Feb. 6, 1940.   W. D. HERSHBERGER   2,189,549
ANTENNA SWITCHING SYSTEM
Filed March 18, 1938   2 Sheets-Sheet 2
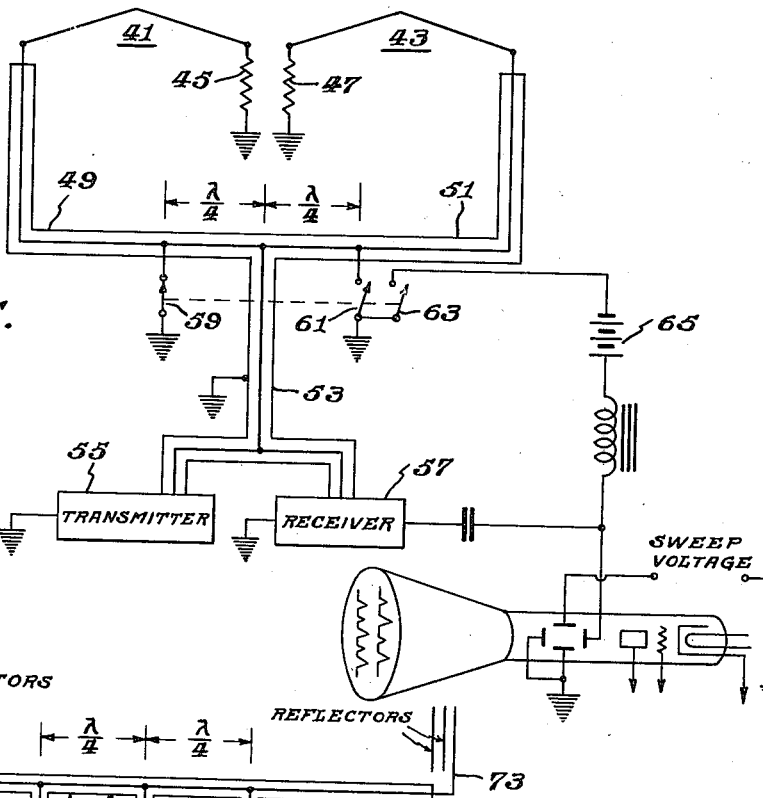
Fig. 5.
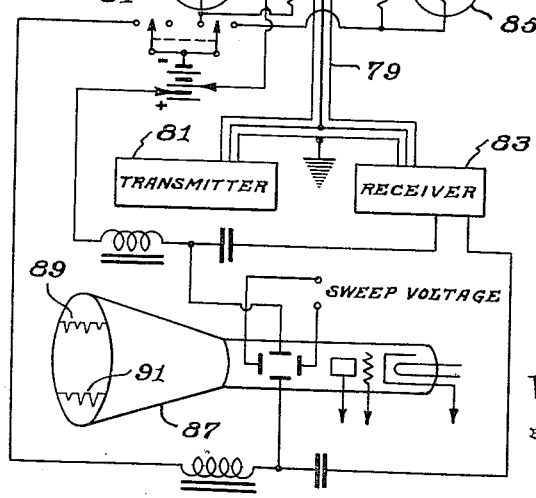
Fig. 6.
Inventor
William D. Hershberger
By
Attorney Patented Feb. 6, 1940

2,189,549

UNITED STATES PATENT OFFICE 2,189,549

ANTENNA SWITCHING SYSTEM

William D. Hershberger, Collingswood, N. J., assignor to Radio Corporation of America, a corporation of Delaware Application March 18, 1938, Serial No. 196,587

6 Claims. (Cl. 250—1)

This invention relates to antenna switching systems and especially to an antenna switching means for an obstacle detection system which is operated by pulses of radio frequency energy. In an obstacle detecting system of the radio pulse-echo type, a pulse of radio frequency energy is directively radiated. If the pulse strikes a reflecting object, the pulse will be reflected and on return to a suitable receiver including, for example, a cathode ray tube will give rise to observable effects. Generally, the cathode ray tube circuit includes a sweep voltage which moves the ray over a scale in synchronism with the interval between successive pulses. The scale may be horizontal with vertical departures indicating outgoing pulses as well as pulses returning after reflection.

The indications generally differentiate between reflecting objects located at different distances from the transmitter but fail to indicate whether the objects are to the right or left of the line of propagation of the pulses of radio frequency energy. When, for example, obstacle detectors are used on aircraft, it is very desirable to indicate immediately to the pilot whether a given obstacle is to the right or left of the line of flight. While the pilot can distinguish reflections from obstacles to left and right of the craft's axis by altering the line of flight, such procedure takes time and, during poor visibility, places an undesirable strain on the pilot. Furthermore, it would be helpful to inform the pilot as to obstacles beneath the craft, or the distance from the craft to earth.

If suitable means are provided, the obstacle indicator may be made to scan a path to the left and right of a given line. Likewise, the same apparatus may be made to scan in a horizontal plane, and determine altitude in the vertical plane. Therefore, one of the objects of this invention is to provide means whereby an obstacle detecting system may be used for scanning.

Another object is to provide means whereby any one of a plurality of antennas may be operatively connected to an obstacle detecting system.

Another object is to provide means for switching a receiver or transmitter to any one of a plurality of different directive antennas.

A further object is to provide means for connecting either horizontally directive or vertically directive antennas to an obstacle detecting system.

A still further object is to provide means for simultaneously switching antennas and indicators which separately identify the information received by the respective antennas.

The invention may be best understood by referring to the drawings in which

Figures 5 and 6 are schematic diagrams of antenna and indicator switching circuits.

Figure 1:
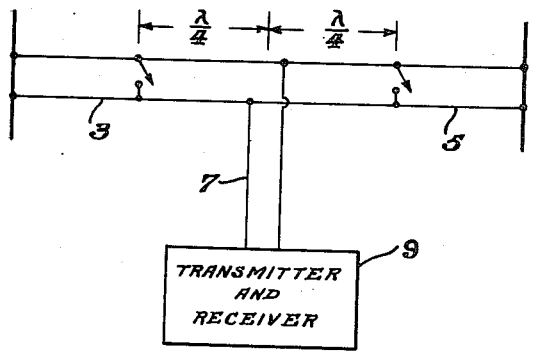
Figure 1 is a schematic circuit diagram of one embodiment of the invention.

Referring to Fig. 1, if it is desired to use either antenna No. 1, or antenna No. 2, which are respectively coupled by transmission lines 3 and 5, and a common transmission line 7 to a transmitter and/or receiver 9, certain difficulties are experienced. In general, if either antenna is disconnected, the impedance match between the remaining antenna and the receiver and transmitter circuits will be destroyed and the system may become very inefficient. If either of the antennas is disabled by short circuiting at the antenna itself, the input impedance of the line at the generator will be altered with resulting losses. Furthermore, short circuiting at frequencies of the order of 500 megacycles per second and upward is ordinarily difficult in its practical application because of the impedance of leads to the short circuiting switch. In order to "short circuit" effectively an ultra high frequency transmission line feeding an antenna, the "short circuit" is accomplished by means which offer low impedance at the shorting point and high impedance at the junction where power is applied to or abstracted from the lines.

These conditions are met by applying the short circuit at a distance from the junction point effectively equal to an odd number of quarter wave lengths. When the short circuits are alternately applied to the lines at distances a quarter wave length from the junction of the lines 3, 5 and 7, the low impedance at the shorting points inverts to a high impedance at the junction point. The high impedance at the junction very effectively keeps the ultra high frequency energy from flowing into the shorted line and at the same time does not alter the impedance of the line being used.

Figure 2:
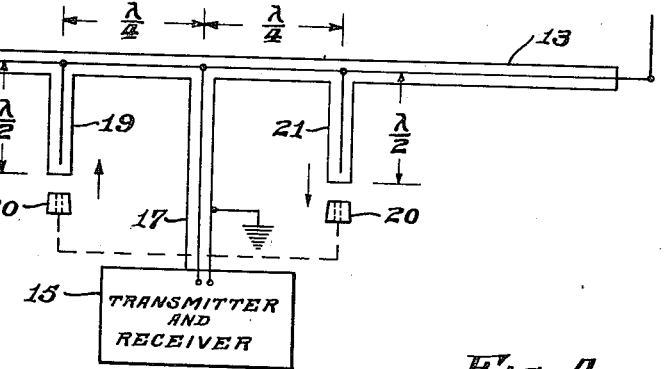
Figure 2 is a schematic circuit diagram of a modified embodiment.
Figure 3:
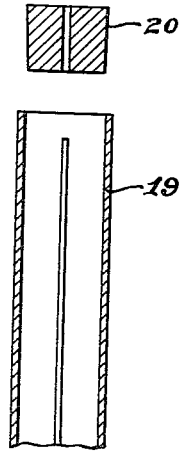
Figure 3 is a sectional view of a short circuiting member.

In some installations, see Fig. 2, it is not convenient to apply the short circuits at the quarter wave ($\lambda/4$) points; in such installations the shorting members may be arranged by connecting a half wave (λ/2) line to the quarter wave (λ/4) points. For example, the antennas No. 1 and No. 2 are connected together by concentric transmission lines 11, 13, and to a transmitter and receiver 15 by a common concentric line 17. At points spaced (λ/4) (or an odd number of quarter wave length) from the junction of the lines 11, 13, 17 a pair of half wave (λ/2) concentric lines 19, 21 are connected. While these lines 19, 21 are described as half wave, it should be understood that the lines may have lengths equal to integral numbers of half wave lengths. At the open ends of these half wave lines, shorting plugs 20 (see Fig. 3) are alternately inserted. The short circuit at the open end of the half wave line is transferred as a short circuit at the connected end which is one quarter wave length from the junction. Therefore, a short circuit at the open end of the half wave line is a short circuit at the quarter wave point and a high impedance at the junction point 11, 13, 17.

Figure 4:
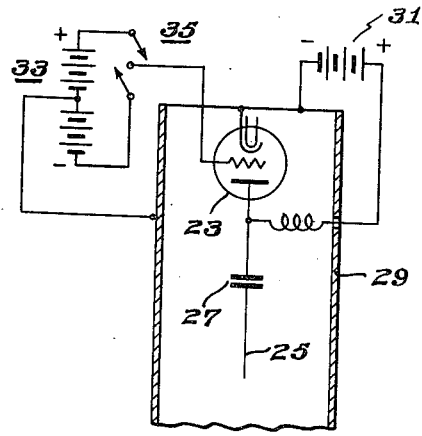
Figure 4 is a circuit diagram of a thermionic or gaseous discharge tube connection for varying the impedance of a transmission line.

While a mechanical switching or short circuit system may be used, an electric means is often preferable. In Fig. 4 a thermionic or gaseous discharge tube 23 is connected to the open end of a concentric line as follows: The anode is connected to the inner conductor 25 through a blocking capacitor 27. The cathode is connected to the outer conductor 29. An anode battery 31 is connected between the cathode and anode. The grid of tube 23 is arranged so that it may be biased either positively or negatively with respect to cathode by a battery 33 and suitable keying means 35.

When the grid is biased negatively, the anode current is cut off. With the anode current zero, the impedance between cathode and anode becomes very high and for practical purposes the tube offers reactance which may be effectively included in the concentric line and therefore the line is effectively open. When the grid is biased positively, the anode-cathode impedance may be made very low and for practical purposes the open end of the line is short circuited by the tube impedance. The tube is preferably a gas tube so that the anode-cathode impedance may be made very low. It should be understood that the grid bias voltage may be obtained from any suitable source; such as portions of the transmitter or receiver networks.

While the foregoing systems are generally useful in switching any one of a plurality of antennas to a transmitter or receiver, a particular use is found in obstacle detection systems. For example, if obstacle detection is to be practiced along angularly disposed bearing lines intersecting at the transmitter, then the antennas may be made directive along these lines and, as the antennas are alternately used, the indicator, which may be a cathode ray tube, may be biased to give separate and distinctive indications for each antenna. For example, in left-right scanning, the indications may be made in parallel vertical traces which are respectively horizontally disposed to left and right to indicate obstacles to left and right.

If the system is used for both obstacle detection in a horizontal plane, and altitude determination, the indications may be made, respectively, in horizontal and vertical traces. In such systems for horizontal obstacle detection, it is preferable that the cathode ray have a horizontal sweep, vertical displacement for obstacle signals, long sweep (i. e. long sweep corresponding to long range), long high power pulse, and narrow reception band. In altitude determination, by contrast, the sweep is vertical, horizontal displacement for ground indication, shorter sweep, short low power pulse, and wider reception band. It should be understood that the foregoing conditions are met by antenna disposition, antenna selection, and electrical control of the receiver and transmitter, all of which may be had by single control switching, preferably at a rate above the persistence of vision.

Fig. 5 represents, in schematic diagram form, a pair of antennas 41, 43 which are terminated in impedances 45, 47 which prevent radiation in undesired directions. The antennas are several wave lengths long and are directive. The antennas are coupled by concentric lines 49, 51 which terminate in a common concentric line 53 which is connected to a transmitter 55 and a receiver 57. The short circuiting switches 59, 61 are connected at points respectively spaced quarter wave lengths from the junctions of lines 49, 51, 53. A third switch 63 is connected to a biasing battery 65 which applies a steady deflecting potential to the cathode ray deflecting electrodes. The output of the receiver 57 is also applied to the deflecting electrodes. In this manner separate and distinctive traces are obtained for each of the operating antennas. The switches 59, 61, 63 may be operated by a single control. Inasmuch as the sweep voltages, cathode ray tube, receiver and transmitter circuits are not part of this invention, and are well known to those skilled in the art, no detailed showing is deemed necessary.

The circuit of Fig. 5 shows mechanical switching; thermionic tube keying or switching may be substituted as indicated in Fig. 6. The antennas 71, 73 are connected by transmission lines 75, 77 to a common line 79 to a transmitter 81 and receiver 83. At distances (λ/4) from the junction of the lines 75, 77, 79 half wave (λ/2) lines are connected to the transmission lines 75, 77. At the open ends of the half wave lines thermionic tubes 84, 85 are connected as previously described in connection with Fig. 4. As the required biasing voltages are applied to the tubes 84, 85, the cathode ray tube 87 deflecting electrodes are suitably biased to provide separate and distinctive traces 89, 91.

Thus an antenna switching system has been disclosed. The switching is characterized by the effective transfer of ultra high radio frequency energy from a transmitter to either of two antennas, or from either one of two antennas to a receiver at will. While only a pair of antennas are shown, a larger number may be used. The invention is also specifically applied to an obstacle detection system in which waves are propagated along divergent paths and reflected waves are separately indicated to distinguish reception along either path. In several of the figures the transmitter and receiver are connected to a common transmission line. No detailed description of the receiver and transmitter coupling has been shown in this specification as a complete disclosure will be found in the copending application Serial No. 184,354, filed January 11, 1938 by Wolff and Hershberger.

I claim as my invention:

1. An antenna system including a pair of antennas, transmission lines connecting said antennas to a common junction, radio apparatus, means connecting said apparatus to said junction, a pair of transmission lines having lengths equal to an integral number of half wave lengths and connected to said first mentioned lines at points spaced an odd number of quarter wave lengths from said junction, and means for short circuiting one or the other of the open ends of said last mentioned pair of transmission lines.

2. An antenna system of the character of claim 1 further characterized by the means for short circuiting including a variable impedance tube connected to said open ends and including means for changing the impedance of said tube connection from a low value to a relatively high value.

3. An antenna switching system including in combination a pair of antennas, transmission lines connecting said antennas, a radio receiver, means connecting said receiver to a junction on said transmission lines intermediate said antennas, means for short circuiting one or the other of said lines at points spaced substantially an odd number of quarter wave lengths from said junction, and a cathode ray tube including two scales for respectively indicating signals received on the one or the other of said antennas which is connected through the transmission line not short circuited by said short circuiting means.

4. An antenna switching system including in combination a plurality of antennas, transmission lines connecting said antennas to a junction point, a radio transmitter, a radio receiver, means connecting said transmitter and said receiver to said junction point, means spaced an odd number of quarter wave lengths from said junction point for shunting all but one of said lines with a very low impedance, and a single means for indicating signals received over said one line, said indicating means including separate scales for distinctively indicating which line is operating.

5. An antenna switch system including a plurality of antennas, two transmission lines connecting said antennas to a junction point, a radio transmitting and receiving device connected to said junction point, means spaced an odd number of quarter wave lengths from said junction point and connected to said transmission lines for shunting across first one than the other of said lines an impedance varying at the operating frequency from a substantial short circuit to a substantial open circuit at said shunting connection and a very high impedance at said junction point, and a cathode ray tube connected to said receiving device for indicating on separate scales corresponding respectively to said antennas reception of signals from said one or the other of said lines.

6. A system of the character of claim 5 further characterized by the last mentioned means including thermionic tubes whose cathode anode circuits are included in said shunting connection and whose shunting effect is varied by varying their cathode-anode circuit impedance.

WILLIAM D. HERSHBERGER.